United States Patent [19]

Rector

[11] 4,113,453

[45] Sep. 12, 1978

[54] ANTI-POLLUTION DEVICE FOR INDUSTRIAL STACKS

[76] Inventor: Charles B. Rector, Buckhorn Lake St. Pk., Buckhorn, Ky. 41721

[21] Appl. No.: 811,129

[22] Filed: Jun. 28, 1977

[51] Int. Cl.² .............................................. B01D 50/00
[52] U.S. Cl. ........................................ 55/263; 55/269; 55/466; 110/119; 261/DIG. 9
[58] Field of Search .................... 55/80, 83, 220, 222, 55/263, 267–269, DIG. 30, 466; 110/119; 261/16, 17, DIG. 9

[56] References Cited

U.S. PATENT DOCUMENTS

| 1,065,985 | 7/1913 | Swen | 261/17 |
|---|---|---|---|
| 1,120,129 | 12/1914 | Cable | 261/DIG. 9 |
| 1,279,895 | 9/1918 | Minton | 261/17 |
| 3,823,531 | 7/1974 | Crowley | 261/17 |
| 3,972,696 | 8/1976 | Angelillo | 261/DIG. 9 |

FOREIGN PATENT DOCUMENTS

Ad.19,858 of 1912 United Kingdom ....................... 55/263

Primary Examiner—Bernard Nozick
Attorney, Agent, or Firm—Howard I. Podell

[57] ABSTRACT

An anti-pollution system for industrial smoke stacks has a source of live steam feeding steam to a nozzle centered in the upper part of the stacks and several concentrically steam cooling towers of progressively smaller diameter. Each chamber opens into the other and has a drain for conveying water laden with unburned particles and soot to filters at the bottom of the stacks.

2 Claims, 2 Drawing Figures

ANTI-POLLUTION DEVICE FOR INDUSTRIAL STACKS

BACKGROUND OF THE INVENTION

This invention relates to an anti-pollution system for industrial chimneys of plants which generate sulfur, sulfur oxides, mercaptans, hydrocarbons, soot and the like.

At the present time expensive scrubbers designed to trap pollutants are being installed in plant stacks. Even with these, it is often difficult to comply with the minimum emissions requirements of the Clean Air Act, if high sulfur coal is used. As a result, low sulfur coal is being burned in applications for which it is too costly, smply in order to comply with the law.

In another current approach 800 feet tall stacks are being built to dilute the pollutants. Many experts, however, feel that this is too costly and that the solution to pollution is not dilution.

The principal object of this invention is to provide a device or article of this character which combines simplicity, strength and durability in a high degree, together with inexpensiveness of construction.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

BRIEF DESCRIPTION OF THE DRAWINGS

In the accompanying drawing, in which is shown one of the various possible illustrative embodiments of this invention, wherein like reference character identify the same or like parts.

DESCRIPTION OF THE PREFERRED EMBODIMENT

Figure 1:
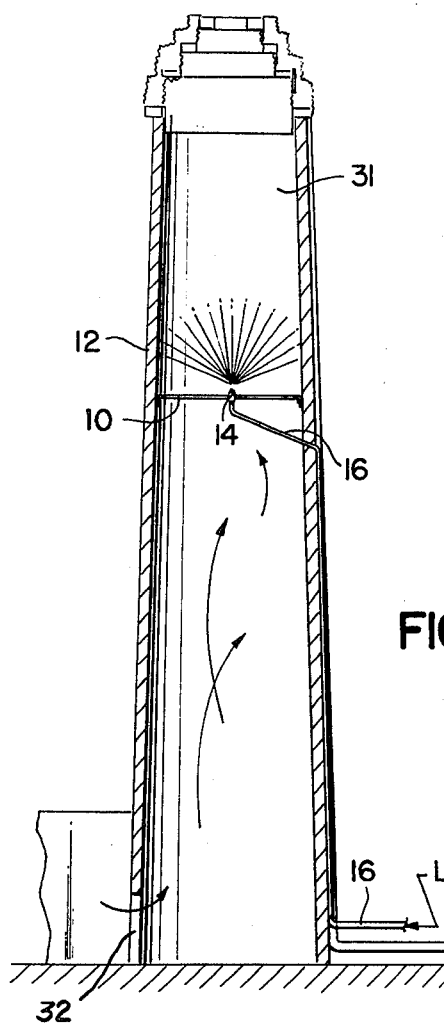
FIG. 1 is a front election in section of the system of the invention installed in a stack.
Figure 2:
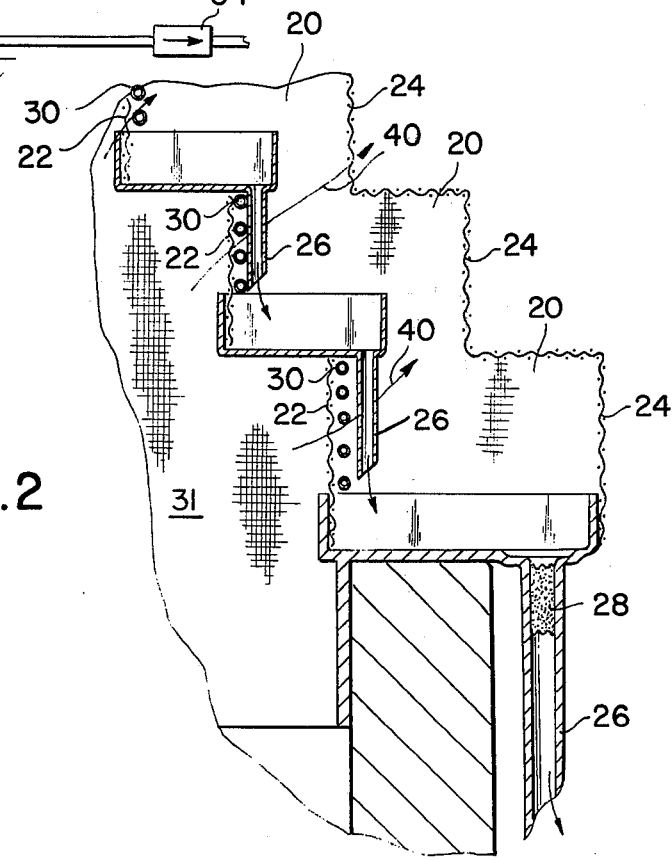
FIG. 2 is a fragmentary cross-sectional view of the steam cooling towers.

As shown in FIG. 1, the system of the invention comprises a brace 10 mounted in the upper part of stack 12 about one-third way from its top. Brace 10 holds an upwardly directed nozzle 14 supplied with super atmospheric or "live" steam through pipe 16 from a source thereof near the base of stack 12.

Mounted on top of stack 12 is a plurality of cooling chambers 20 of progressively smaller diameter. Each chamber communicates with the next.

Each chamber is formed of a pair of filters 22 and 24 and has a drain pipe 26 over which fits a part of filters 24. Each drain communicates with the next lower one. In the lowest drain is positioned a filter 28. A cooling coil 30 is fixed between each chamber 20 and the flue 31 of the stack. A filter station 34 is at the base of the stack. The principle of operation of the system is as follows.

Nozzel 14 sprays the entire circumference of the stack for a few feet above the nozzle. The steam carries carbon, gases and unburned particles upwardly into the cooling chambers. There the steam is condensed to water by cooling coils 30 with the various pollutants clinging thereto. The pollutant-laden water condenses in chamber 20 and flows through the drains to be filtered and collected for re-use and re-forming as steam, with filters 22 and 24 preventing condensed water vapor from being blown out of chambers 20 while permitting exhaust of the stack gases 40.

Naturally, the number of cooling chambers can be varied as required although three are shown.

Preferably, the piping will be mounted as shown on the side of the stack opposite the combustion inlet 32 for the products shown by arrows in FIG. 1.

The operation and use of the invention hereinabove described will be evident to those skilled in the art to which it relates from a consideration of the foregoing.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention I claim as new and desire to secure by Letters Patent:

1. In combination with an industrial stack that serves as a chimney, an anti-pollution system which conveys pollutants such as unburned particles and soot from the stack gases exhausted by the stack, comprising a vertical stack for exhausting gases of combustion led into the lower end of said stack, a source of steam terminating in a nozzle mounted in an upper portion of said stack, said nozzle oriented to spray the inner circumference of the stack with steam, so as to spray the combustion gases in said stack, said stack fitted above its upper extremity adjacent and above the outlet of the stack with a plurality of sets of cooling coil means with each set of cooling coil means formed as a coil along a cylindrical path concentric within the axis of the stack, with each set of such coils formed along a cylindrical path of a lesser diameter than the set below the said set, with circular drain means mounted immediately below each set of cooling coil means for collecting water containing pollutants that has been condensed by the cooling coil means from steam sprayed into the stack, said drain means joined to a filter for separating said pollutants from the condensed water, said cooling coils and drain means enclosed about their external radial periphery by an outer filter means for prevention of passage of condensed water vapor which means permits passage of exhaust stack gas so that water vapor condensed by said coils cannot escape in the radial outward direction from said stack.

2. The combination as recited in claim 1 in which said cooling coil means are each bounded by an inner filter means for prevention of passage condensed water vapor which means permits passage of exhaust stack gas so that water vapor condensed by said coils cannot escape in the radial inward direction of said stack into the path of travel of rising stack exhaust gas.

* * * * *